United States Patent
Patel

(10) Patent No.: US 6,448,313 B1
(45) Date of Patent: Sep. 10, 2002

(54) TEMPORARY PROTECTIVE COATING COMPOSITIONS

(75) Inventor: Bhanu D. Patel, Canton, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/770,899

(22) Filed: Jan. 26, 2001

Related U.S. Application Data

(60) Provisional application No. 60/180,459, filed on Feb. 3, 2000.

(51) Int. Cl.[7] .............................. C08K 5/34; C08K 5/41; C08K 5/16
(52) U.S. Cl. .......................... 524/89; 524/86; 524/156; 524/165; 524/198; 524/315; 524/319; 524/371; 524/375; 524/386; 524/387
(58) Field of Search ............................ 524/86, 89, 156, 524/165, 198, 315, 319, 371, 375, 386, 387; 428/421, 422

(56) References Cited

U.S. PATENT DOCUMENTS

| | | | | |
|---|---|---|---|---|
| 3,696,498 A | | 10/1972 | Leontaritis et al. ............ 29/424 |
| 4,069,244 A | * | 1/1978 | Mueller ....................... 252/353 |
| 4,079,028 A | * | 3/1978 | Emmons et al. ............. 524/700 |
| 4,169,088 A | | 9/1979 | Hansen ....................... 260/29.6 |
| 4,289,671 A | | 9/1981 | Hernandez .................. 260/28.5 |
| 4,792,464 A | | 12/1988 | Martenson ................... 427/156 |
| 4,844,833 A | | 7/1989 | Komatsu et al. ........ 252/174.13 |
| 5,006,578 A | | 4/1991 | Masuda et al. .............. 524/128 |
| 5,281,654 A | | 1/1994 | Eisenhart et al. ............ 524/500 |
| 5,330,788 A | | 7/1994 | Roberts ....................... 427/154 |
| 5,616,273 A | | 4/1997 | Clark et al. ..................... 252/2 |
| 5,639,814 A | | 6/1997 | VanBuskirk et al. ......... 524/389 |
| 5,693,423 A | * | 12/1997 | Laura et al. ................. 428/413 |
| 5,739,191 A | | 4/1998 | Woodhall et al. ............ 524/377 |
| 5,747,234 A | | 5/1998 | Wexler et al. ............... 430/523 |
| 5,750,190 A | | 5/1998 | Woodhall et al. ............ 427/156 |
| 6,011,107 A | | 1/2000 | Maxwell et al. ............. 524/566 |

* cited by examiner

Primary Examiner—Kriellion A. Sanders
(74) Attorney, Agent, or Firm—Stephen D. Harper

(57) ABSTRACT

Aqueous compositions are provided which are useful for forming temporary protective coatings on metallic substrates. The aqueous compositions may contain polyvinyl alcohol, surfactant and corrosion inhibitor. The protective coating may be easily removed once the substrate has been formed or otherwise shaped.

34 Claims, No Drawings

TEMPORARY PROTECTIVE COATING COMPOSITIONS

CROSS-REFERENCE TO RELATED APPLICATIONS

This application claims priority from U.S. provisional application Ser. No. 60/180,459, filed Feb. 3, 2000, the disclosure of which is incorporated herein by reference.

FIELD OF THE INVENTION

The present invention relates to aqueous compositions which are useful for creating protective coatings on metallic substrates. The protective coating may be readily removed once the substrate has been formed or otherwise shaped.

BACKGROUND OF THE INVENTION

Many different goods are currently manufactured by drawing, pressing, bending or otherwise forming flat sheets of metal to the desired shape or configuration. In many cases, such metal sheets are finished with a decorative coating such as paint prior to forming. It will frequently be desirable to apply a temporary coating on top of the decorative coating in order to protect the decorative coating during forming, since forming may mar or otherwise damage the untreated decorative coating. Where the decorative finish is to be applied to the metal sheet after it is formed, temporary coating of the bare metal surface to protect it against corrosion or contamination will often be desirable. The development of temporary coatings which provide effective protection during forming, yet can be readily removed once forming is completed, thus would be of great value.

SUMMARY OF THE INVENTION

The present invention provides an aqueous composition comprising water, at least one polyvinyl alcohol, at least one surfactant and at least one corrosion inhibitor. In one embodiment of the invention, the aqueous composition has a mildly basic pH and is comprised of water, at least one polyvinyl alcohol, at least one surfactant (preferably a low foaming fluorinated, alkoxylated phenol or acetylenically unsaturated surfactant), at least two different corrosion inhibitors, and at least one coalescing solvent. A protective coating is obtained by applying the aforedescribed aqueous composition to a surface of a substrate (particularly a metallic substrate) and drying said aqueous composition. The dried coating protects the substrate surface, which may be bare or painted metal, during forming of the substrate. The protective coating is thereafter easily removed by a means such as peeling or rinsing with water.

DESCRIPTION OF THE INVENTION

The coating compositions of the present invention are aqueous in character. That is, water is used as the primary or predominate solvent or carrier for the other components of the coating composition. Although organic solvents, particularly alkanolamines and coalescing solvents, may additionally be present (as will be explained in more detail later), such solvents are utilized at relatively low concentrations (e.g., less than about 10 weight percent total, preferably less than about 6 weight percent total).

One or more polyvinyl alcohols are included in the aqueous composition. Such resins are commercially produced by the hydrolysis of polyvinyl acetate. The properties of the aqueous composition as well as the properties of the protective coating obtained using the aqueous compositions of this invention may be varied as desired by adjusting the degree of hydrolysis and the molecular weight of the polyvinyl alcohol. The degree of hydrolysis, for example, may suitably range from about 80% to about 100%, preferably 85% to 95%. Number average molecular weight may suitably range from about 10,000 to about 100,000. It is unnecessary to react or otherwise modify the polyvinyl alcohol prior to use. In preferred embodiments of the invention, both the polyvinyl alcohol and the aqueous composition in general are substantially free of plasticizer.

Polyvinyl alcohols useful in the invention may be readily obtained from commercial sources, including Air Products and Chemicals Inc. (which sells polyvinyl alcohols under the trademark AIRVOL) and DuPont (which sells polyvinyl alcohols under the trademark ELVANOL). While the concentration of the polyvinyl alcohol in the aqueous composition is not believed to be particularly critical, typically concentrations of from about 2 to about 50 (preferably, about 5 to about 20) percent by weight (calculated on a solids basis) are utilized.

Other water-soluble and/or water-dispersable polymeric resins may optionally also be present in the aqueous composition, including, for example, acrylic resins, polyethylenimines, polyethylene oxides, polyvinyl pyrrolidones, polyacrylamides and the like. Polyvinyl alcohol is generally the predominate polymeric resin in the composition, however (i.e., at least 50% by weight of the polymeric resin component of the composition is comprised of polyvinyl alcohol).

One or more surfactants (surface active agents) are also incorporated in the aqueous composition to provide satisfactory spreading and leveling of the aqueous composition on the surface of the substrate being coated. The surfactant(s) promote wetting of the substrate surface and also help to stabilize the aqueous composition against phase separation during storage. Preferably, the surfactants selected for use are low foaming in order to minimize the formation of bubbles in the protective coating. Fluorinated surfactants, alkoxylated phenol surfactants, and acetylenically unsaturated non-ionic surfactants have been found to be particularly suitable for use. Suitable fluorinated surfactants may be of the non-ionic, anionic, or amphoteric type, including combinations or mixtures thereof. Nonionic fluorinated surfactants include perfluoroalkyl polyethers and fluoroaliphatic polymeric esters such as those, for example, described in U.S. Pat. No. 5,747,234, incorporated herein by reference in its entirety. Illustrative anionic fluorinated surfactants include fluoroaliphatic sulfates and fluoroaliphatic sulfonates such as those for example, described in U.S. Pat. No. 5,616,273, incorporated herein by reference in its entirety. Suitable amphoteric fluorinated surfactants include surfactants containing fluoroaliphatic groups, carboxyl groups and amine and/or amide groups such as those described in U.S. Pat. No. 4,069,244 (incorporated herein by reference in its entirety). Amine perfluoroalkyl sulfonates may also be used. Fluorinated surfactants useful in the present invention may be readily obtained from a number of commercial sources including Ciba-Geigy (under the trademark LODYNE), Minnesota Mining and Manufacturing (under the trademark FLUORAD), Elf Atochem (under the trademark FORAFAC) and E. I. duPont de Nemours (under the trademark ZONYL). Suitable acetylenically unsaturated nonionic surfactants include surfactants containing at least one hydroxylated or alkoxylated acetylenically unsaturated hydrophobic moiety. Preferably, such surfactants contain two hydrophobic groups connected by an acetylenic linkage with hydroxyl as alkoxy (preferably, ethoxy) groups pendant near the acetylenic linkage. Each hydrophobic group connected with the acetylenic linkage preferably contains from 4 to about 10 carbon atoms. Surfactants of this type are available commercially from Air Products and Chemical Company under the trademark SURFYNOL.

Suitable alkoxylated phenol surfactants include those materials prepared by reacting a phenol such as an alkyl phenol (e.g., nonylphenol) with one or more epoxides such as ethylene oxide and/or propylene oxide. Surfactants of this type are available commercially from Hoechst, for example.

The precise amount of surfactant(s) used in the aqueous compositions of the present invention is not thought to be critical; the optimum concentration for a particular application may be readily determined by routine experimentation. Typically, however, surfactant levels of from about 0.05 to about 0.6 percent by weight (based on the weight of the aqueous composition) will be effective.

One or more corrosion inhibitors (substances capable of inhibiting the corrosion of a metallic substrate surface) are also present in the aqueous composition. Although any of such materials known in the surface treatment field may be employed, it has been found that the use of one or more alkanolamines in combination with one or more corrosion inhibitors other than alkanolamines is advantageous.

Suitable alkanolamines include those compounds containing at least one nitrogen atom and at least one hydroxyl group substituted on an alkyl group including, for example, amino-alkanols, monoalkyl amino-alkanols, dialkyl amino-alkanols and mixtures thereof. Illustrative alkanolamines include dimethylethanolamine, diethylethanolamine, dimethylpropanolamine, 2-amino-2-methyl-1-propanol, 2-dimethylamino-2-methyl-1-propanol, mono-, di- and triethanolamine, $N,N,N^1,N^1$,-tetrakis-(2-hydroxyethyl)-ethylene diamine and the like. In addition to functioning as corrosion inhibitors (e.g., protecting the surface of a ferrous substrate treated with the aqueous compositions against rusting), the alkanolamines also adjust the pH of the aqueous composition and act as solvents.

Other suitable corrosion inhibitors include nitrates, nitrites, borates, phosphates, silicates, borated amines, carboxylated amines, organic acids and their esters, metal salts and anhydrides (e.g., N-oleyl-sarcosine, sorbitan mono-oleate, lead naphthenate, dodecenyl-succinic acid and its partial esters and amides, 4-nonylphenoxy acetic acid), primary, secondary and tertiary aliphatic and cycloaliphatic amines and amine and zirconium salts of organic and inorganic acids (e.g. amine salts of nitrous acid, chromic acid, carbonic acid, carbamic acid, aliphatic carboxylic acids, aryl-substituted aliphatic carboxylic acids, and substituted or unsubstituted benzoic acids), nitrogen-containing heterocyclic compounds (e.g., thiadiazoles, substituted imidazolines, diazoles, triazoles, oxazolidines, oxazolines), quinolines, quinones, anthraquinones, propyl gallate, barium dinonyl naphthalene sulfanate, ester and amide derivatives of alkenyl succinic anhydrides or acids, benzothiazolylthio-substituted succinic acids or anhydrides, dithiocarbamates, dithiophosphates, and amine salts of alkyl acid phosphates, polyamine fatty acid salts and the like. Especially preferred corrosion inhibitors include alkanolamines, adducts of carboxylic acids and amines, nitrogen-containing heterocyclics, and mixtures thereof.

In one preferred embodiment of the invention, one or more adducts of carboxylic acids and amines are used in combination with one or more nitrogen-containing heterocycles (especially oxazolidines).

Sufficient amounts of one or more corrosion inhibitors are incorporated in the aqueous composition so as to increase the corrosion resistance of the temporary protective coating formed therefrom, as compared to an analogous coating which does not contain corrosion inhibitor. The optimum amount of corrosion inhibitor(s) will vary depending upon the corrosion inhibitor(s) selected for use, among other factors, but may be readily determined without undue experimentation. Typically, the aqueous composition contains from about 0.5 to about 7 weight percent corrosion inhibitor in total. In one embodiment of the invention, a combination comprised of from about 0.1 to about 5 weight percent alkanolamine(s) and from about 0.1 to about 5 weight percent of at least one additional corrosion inhibitor other than an alkanolamine corrosion inhibitor (preferably a nitrogen containing corrosion inhibitor, more preferably a corrosion inhibitor selected from the group consisting of nitrogen-containing heterocyclics and adducts of carboxylic acids and amines) is employed. In another embodiment of the invention, from about 1 to about 5 weight percent of one or more nitrogen-containing heterocycles (preferably, oxazolidines) and about 0.5 to about 2.5 weight percent of one or more adducts of carboxylic acids and amines are used in combination.

The aqueous composition preferably includes at least about 0.2 weight percent of one or more coalescing solvents which are miscible with or soluble in water. Coalescing solvent concentrations of up to about 10 percent by weight will typically be effective, although preferably no more than about 5 percent by weight coalescing solvent is present. Any of the solvents known in the coatings field to assist in the formation of a continuous smooth film may be utilized, including, for example, alcohols, glycols (e.g., propylene glycol), glycol oligomers (e.g., tripropylene glycol), poly-alkylene glycols (e.g., polypropylene glycol), polyols containing three or more hydroxyl groups (e.g., glycerin), and ethers and esters thereof (e.g., glycol ethers, glycol esters and polyol esters). Monoalkyl ethers of propylene glycol, ethylene glycol, dipropylene glycol and diethylene glycol, where the alkyl group contains from 1 to 6 carbon atoms, may be used, for example.

The viscosity and other rheological properties of the aqueous compositions may be varied as desired by the addition of one or more thickeners (also referred to as rheology modifiers). Although the optimum viscosity may vary considerably depending upon the particular end-use application for the aqueous composition, typically the viscosity will be in the range of from about 100 cps to about 5000 cps (preferably, about 500 cps to about 3000 cps) at 25° C. as measured using a Brookfield digital viscometer (RV spindle #4, 20 rpm). While any of the substances known to be capable of increasing the viscosity or otherwise modifying the rheological characteristics of an aqueous composition may be employed, particularly preferred thickeners include polymeric thickeners. Suitable polymeric thickeners include acrylic copolymers such as styrene-acrylic copolymers and urethane-acrylic copolymers. Acrylic polymer thickeners are well known in the field and are readily available from commercial sources such as Rohm & Haas (under the trademarks ACUSOL and RHOPLEX), Johnson Wax (under the trademark JONWAX) and CCP Polymers (under the trademark CHEMPOL). Thickeners based on urethane block copolymers are also particularly preferred for use in the present invention, especially hydrophobically modified urethane thickeners. Such substances are polyurethanes which contain both hydrophobic groups (e.g., at least two hydrocarbon groups having at least seven carbon atoms each) and hydrophilic groups (sufficient to ensure solubility in water or water/water-miscible solvent blends). The preparation of hydrophobically modified urethane thickeners is described in U.S. Pat. Nos. 4,079,028 and 5,281,654, incorporated herein by reference in their entirety. Hydrophobically modified urethane thickeners are also available from commercial sources under the trademarks ACRYSOL RM-825, ACRYSOL RM-8W, ACRYSOL RM-12W, ACRYSOL SCT-275, RHEOLATE 225 and TAFIGEL PUR60.

Generally speaking, thickener concentrations of from about 0.5 to about 5 weight percent are utilized, although lesser or greater amounts may be present depending upon the thickener(s) selected, the rheological properties and concentrations of the other components of the aqueous compositions (particularly the polyvinyl alcohol), and the extent of thickening desired. In one embodiment of the invention, however, no thickener is utilized.

The aqueous composition preferably is neutral to basic, with mildly basic aqueous compositions being particularly preferred. The composition may be rendered basic by the incorporation of ammonia, alkanolamines, and other amines, for example. Such additives also help neutralize the acidity often associated with the polyvinyl alcohol component. The pH is desirably in the range of from about 6 to about 11 (more desirably, from about 8 to about 10 to avoid any degradation or attack of aluminum or painted surfaces). Other ingredients in addition to the aforementioned components may also be present in the aqueous compositions of the invention such as, for example, flow modifiers, surface control additives, colorants (dyes, pigments), stabilizers, defoaming agents, and the like.

The aqueous composition is made by conventional means, typically including a step of mixing the components of the aqueous composition at atmospheric pressure so as to form a substantially homogeneous mixture. In a preferred embodiment of the invention, the components are selected such that the aqueous composition remains stable during storage (i.e., does not phase separate). The components may be heated during mixing, if necessary.

The typical and preferred concentration ranges of the components described hereinabove are stated in reference to the levels in the aqueous composition when it is to be actually applied to the substrate surface.

The aqueous composition is applied to the surface of a substrate by one of a variety of techniques. Preferred techniques include brushing or spraying of the aqueous composition onto the surface, although dipping, calendaring, rolling or other methods may also be utilized. If phase separation has occurred, it will generally be desirable to thoroughly mix the aqueous composition before applying it to the substrate surface. In preferred embodiments, the resulting wet coating of aqueous composition is from about 5 to about 25 mils thick, more preferably about 8 to about 20 mils thick.

The coating of aqueous composition is then permitted to dry, normally at ambient temperatures and pressures although drying can be accelerated if so desired by heating using hot air, infrared heat or the like. However, curing (chemical reaction) of the components of the aqueous compostion is not required in order to form a coating capable of providing good protection during forming of the substrate to which the coating is applied. In one embodiment of the invention, the aqueous composition does not contain any components capable of reacting with other components under conditions normally encountered during drying. Once dry, the aqueous composition forms a protective film coating (typically, from about 0.3 mils to about 5 mils thick) which is impact resistant, drawable, formable, and easily removed. The term "formable" is defined as the ability of a coated sheet of metal to be bent without creating substantial cracks or voids in the film. The term "drawable" is defined as the ability to stamp a coated sheet of metal into a curved three-dimensional shape without substantially breaking the sheet and without causing significant damage to the coated sheet of metal. For many typical applications, the protective coatings provided by the aqueous compositions of the present invention show remarkable improvements in the afore-stated properties.

Removal of the dried coating is easily effected by either peeling off the coating or contacting the coated substrate with water, preferably an aqueous alkaline solution. An advantage of the present invention is that the water or aqueous alkaline solution need not be heated substantially above room temperature to accomplish effective and rapid removal of the protective coating. "Contacting" means spraying, flooding, dipping (immersion) and other such methods.

EXAMPLES

An aqueous composition in accordance with the present invention may be prepared by first adding slowly polyvinyl alcohol to the desired quantity of deionized water at 77° F. to 80° F. while mixing to disperse the polymer, then heating this mixture to 170° F. to 185° F. until polyvinyl alcohol is completely dissolved (approximately 30–60 minutes). The solution is cooled to about 32° C. (90° F.) and the remaining components (e.g., coalescing solvent, corrosion inhibitor(s), surfactant and colorant)added sequentially. The resulting mixture is mixed thoroughly for 30 minutes following the final addition to yield an aqueous composition suitable for use as a temporary protective coating.

Illustrative examples of different aqueous compositions are shown in Tables 1 and 2. The amounts of the individual components are in weight %, based on the weight of the total aqueous composition.

The aqueous composition may be applied to the surface of a metallic substrate using a "doctor's blade" and then dried using an ultraviolet heat lamp. The dried protective coating thus formed is then visually checked for smoothness and uniformity. If the coating is uniform, it is further evaluated using T-bend and impact tests following ASTM procedures. If the coating passes such tests, the coated substrate is rinsed with cold or hot water to evaluate the ease with which the protective coating may be removed from the substrate.

TABLE 1

| COMPONENT | Example 1 | Example 2 | Example 3 | Example 4 | Example 5 | Example 6 | Example 7 |
|---|---|---|---|---|---|---|---|
| Deionized Water | 32.15 | 32.15 | 32.30 | 31.80 | 15.00 | 83.70 | 83.10 |
| Corrosion Inhibitor A[1] | | | 2.00 | 1.00 | | | |
| Corrosion Inhibitor B[2] | 3.00 | 3.00 | | 1.00 | 3.00 | 3.00 | 3.00 |
| Corrosion Inhibitor C[3] | 1.50 | 1.50 | 1.50 | 1.00 | 1.50 | 1.50 | 1.50 |
| Surfactant A[4] | 0.10 | | | | | | |
| Surfactant B[5] | | 0.20 | 0.10 | 0.10 | 0.20 | 0.20 | 0.20 |
| Surfactant C[6] | 0.10 | | | | | | |

TABLE 1-continued

| COMPONENT | Example 1 | Example 2 | Example 3 | Example 4 | Example 5 | Example 6 | Example 7 |
|---|---|---|---|---|---|---|---|
| Defoamer[7] | | | | 0.30 | | | |
| Flow Modifier A[8] | | | | 0.20 | | | |
| Flow Modifier B[9] | | | | 0.50 | | | |
| Coalescing Solvent A[10] | 1.00 | 1.00 | | 2.00 | | | |
| Coalescing Solvent B[11] | | | 2.00 | | | | |
| Coalescing Solvent C[12] | | | | | 2.00 | 3.50 | 2.00 |
| Polyvinyl Alcohol A[13] | 60.00 | 60.00 | 60.00 | 60.00 | | | |
| Polyvinyl Alcohol B[14] | | | | | 78.00 | | |
| Polyvinyl Alcohol C[15] | | | | | | 7.80 | 10.00 |
| Thickener[16] | 2.00 | 2.00 | 2.00 | 2.00 | | | |
| Colorant A[17] | 0.15 | 0.15 | | | | | |
| Colorant B[18] | | | 0.10 | 0.10 | | | |
| Colorant C[19] | | | | | 0.30 | 0.30 | 0.20 |
| pH | 8.33 | 8.94 | 9.46 | 9.02 | 8.80 | 8.78 | 8.80 |
| Viscosity at 25° C., cps | nm | nm | nm | nm | nm | 1000 | 880 |

[1]Dimethylethanolamine (supplied by Texaco Chemical Co.)
[2]Amine CS-1135, a mixture of 4,4-dimethyloxazolidine and 3,4,4-trimethyloxazolidine (supplied by Angus Chemical)
[3]IRGACOR 1405, an adduct of 4-oxo-4-p-tolyl butyric acid and 4-ethylmorpholine (a product of Ciba Specialty Chemicals, CAS No. 171054-89-0)
[4]LODYNE S-222N, a non-ionic perfluoroalkyl polyether surfactant (a product of Ciba Specialty Chemicals)
[5]LODYNE S-100, an amphoteric fluoroalkylamino carboxylic acid surfactant (a product of Ciba Specialty Chemicals)
[6]SURFYNOL 104-H, an acetylenically unsaturated non-ionic surfactant (a product of Air Products and Chemicals Company)
[7]FOAMEX 825, a polydimethylsiloxane emulsion defoamer (a product of Tego Chemie Services USA, Division of Goldschmidt Chemical Corporation)
[8]TEGOGLIDE 450, a multifunctional surface control additive available from Goldschmidt
[9]MODAFLOW AQ-3000, an amine-neutralized acrylic copolymer in water (a product of Solutia)
[10]propylene glycol n-butyl monoether
[11]glycerin
[12]propylene glycol
[13]AIRVOL 24-203, polyvinylalcohol in ethanol (a product of Air Products and Chemicals)
[14]ELVANOL 52-22 (diluted to 10%), 87-89% hydrolyzed polyvinyl alcohol in small amount (<5%) of methanol and water (a product of E.I. duPont de Nemours)
[15]ELVANOL 52-22 (100%), 87-89% hydrolyzed polyvinyl alcohol
[16]ACRYSOL RM-8, a hydrophobically-modified ethylene oxide-based urethane block copolymer (a product of Rohm & Haas)
[17]UNISPERSE GREEN, copper phthalocyanine in propylene glycol (a product of Ciba Specialty Chemicals)
[18]UNISPERSE BLUE, copper phthalocyanine (a product of Ciba Specialty Chemicals)
[19]FLEXIVERSE BFD-1121 (42.7% solids), phthalocyanine blue in water containing acrylic resin (a product of Sun Chemical Company)

TABLE 2

| COMPONENT | EXAMPLE 8 | EXAMPLE 9 | EXAMPLE 10 | EXAMPLE 11 |
|---|---|---|---|---|
| Deionized Water | 81.10 | 79.37 | 79.37 | 80.00 |
| Corrosion Inhibitor A[1] | 3.00 | 3.00 | 3.00 | 3.00 |
| Corrosion Inhibitor B[2] | 1.50 | 1.50 | 1.50 | 1.50 |
| Surfactant A[3] | — | 0.03 | 0.03 | 0.10 |
| Surfactant B[4] | 0.20 | 0.10 | 0.10 | 0.10 |
| Coalescing Solvent A[5] | — | 2.00 | — | — |
| Coalescing Solvent B[6] | 2.00 | — | — | — |
| Coalescing Solvent C[7] | — | — | — | 2.00 |
| Coalescing Solvent D[8] | — | — | 2.00 | — |
| Polyvinyl Alcohol[9] | 12.00 | 12.00 | 12.00 | 12.00 |
| Colorant A[10] | 0.20 | — | — | — |
| Colorant B[11] | — | 2.00 | 2.00 | 2.00 |
| pH | 8.98 | 8.97 | 8.96 | 8.96 |
| Viscosity at 25° C., Cps | 2080 | 1990 | 2480 | 2550 |

[1]Amine CS-1135, a mixture of 4,4-dimethyl oxazolidine and 3,4,4-trimethyloxazolidine (supplied by Angus Chemical)
[2]IRGACOR 1405, an adduct of 4-oxo-4-p-tolyl butyric acid and 4-ethylmorpholine (a product of Ciba Specialty Chemicals, CAS No. 171054-89-0)
[3]GENAPOL NP915, a propoxylate capped nonyl phenyol ethoxylate (supplied by Hoechst)
[4]LODYNE S-100, an amphoteric fluoroalkylamino carboxylic acid surfactant (a product of Ciba Specialty Chemicals)
[5]TEXANOL, 2,2,4-trimethyl-1,3-pentanediol mono-isobutyrate (supplied by Eastman Chemical, CAS No. 25 265-77-4)
[6]Propylene glycol
[7]Tripropylene glycol
[8]Polypropylene glycol
[9]ELVANOL 52-22 (100%), 87–89% hydroyzed polyvinyl alcohol in small amount (<5%) of methanol and water (supplied by E.l. duPont de Nemouss)
[10]FLEXIVERSE BFD-1121, a phthalo blue colorant containing 42.7% solids (supplied by Sun Chemical)
[11]FLEXIVERSE BFD-1121, 10% solution

What is claimed is:
1. A method of protecting a surface of a metal substrate comprising:

i) applying an aqueous composition to said surface, said aqueous composition comprising:
   a) water;
   b) one or more polymeric resins consisting essentially of 50 percent to 100 percent by weight of one or more polyvinyl alcohol resins and 0 percent to 50 percent by weight of one or more water-soluble or water dispersible resins selected from acrylic, polyethylenimine, polyethylene oxide, polyvinyl pyrrolidone and polyacrylamide resins, wherein the polyvinyl alcohols have a degree of hydrolysis of at least 80%;
   c) at least one surfactant; and
   d) at least one corrosion inhibitor;
ii) drying said aqueous composition to form an easily removable protective coating on said surface, which protective coating is removable by peeling off or by contacting with water or an aqueous alkaline solution; and
iii) after the need for protection passes, removing said easily removable protective coating from said metal substrate by peeling it off or by contacting it with water or an aqueous alkaline solution.

2. The method of claim 1 wherein the aqueous composition additionally comprises at least one thickener.

3. The method of claim 2 wherein at least one thickener is a hydrophobically modified urethane block copolymer.

4. The method of claim 1 wherein said aqueous composition is comprises of at least one amine.

5. The method of claim 1 wherein said aqueous composition is comprised of at least one alkanolamine.

6. The method of claim 1 wherein at least one corrosion inhibitor in the aqueous composition is selected from the group consisting of alkanolamines, adducts of carboxylic acids and amines, and nitrogen-containing heterocycles.

7. The method of claim 1 wherein the aqueous composition additionally comprises at least one coalescing solvent.

8. The method of claim 1 wherein the aqueous composition additionally comprises at least one coalescing solvent selected from the group consisting of alcohols, glycols, glycol oligomers, polyols containing at least 3 hydroxyl groups per molecule, glycol monoethers, monoethers of glycol oligomers, esters of polyols containing at least 3 hydroxyl groups per molecule. polyalkylene glycols, and mixtures thereof.

9. The method of claim 1 wherein the polyvinyl alcohols of component (I) of the aqueous composition have a degree of hydrolysis of from about 85 to about 95%.

10. The method of claim 1 wherein the polyvinyl alcohols of component (I) of the aqueous composition have a number average molecular weight of from about 10,000 to about 100,000.

11. The method of claim 1 wherein component (b) consists essentially of polyvinyl alcohol resins.

12. The method of claim 1 wherein said aqueous composition has a pH in the range of from about 8 to 10.

13. The method of claim 1 wherein the aqueous composition is a single phase.

14. The method of claim 1 wherein said aqueous composition has a viscosity at 25° C. in the range of from about 500 to about 3000 cps.

15. The method of claim 1 wherein said surface is painted.

16. The method of claim 1 wherein said surface is bare metal.

17. The method of claim 1 wherein said metal substrate is subjected to drawing, forming, or both drawing and forming between steps ii and iii.

18. A method of protecting a surface of a metal substrate during drawing and forming of said metal substrate comprising:
   i) applying an aqueous composition to said surface, said aqueous composition consisting essentially of:
      a) water;
      b) one or more polymeric resins consisting essentially of 50 percent to 100 percent by weight of one or more polyvinyl alcohol resins and 0 percent to 50 percent by weight of one or more water-soluble or water dispersible resins selected from acrylic, polyethylenimine, polyethylene oxide, polyvinyl pyrrolidone and polyacrylamide resins, wherein the polyvinyl alcohols have a degree of hydrolysis of 85% to 95%;
      c) at least one surfactant;
      d) at least one alkanolamine;
      e) at least one corrosion inhibitor in addition to alkanolamine(d);
      f) at least one thickener; and
      g) at least one coalescing solvent;
   ii) drying said aqueous composition to form an easily removable protective coating on said surface, which protective coating is removable by peeling off or by contacting with water or an aqueous alkaline solution;
   iii) drawing or forming the metal substrate having the easily removable protective coating thereon; and
   iv) removing said easily removable protective coating from said metal substrate by peeling it off or by contacting it with water or an aqueous alkaline solution.

19. The method of claim 18 wherein polyvinyl alcohol resin is present in the aqueous composition at a concentration of from about 5 to 20 percent by weight.

20. The method of claim 18 wherein surfactant is present in the aqueous composition at a concentration of from about 0.05 to about 0.6 percent by weight.

21. The method of claim 18 wherein alkanolamine in the aqueous composition is present at a concentration of from about 0.1 to about 5 weight percent.

22. The method of claim 18 wherein corrosion inhibitor (e) is present in the aqueous composition at a concentration of from about 0.1 to about 5 weight percent.

23. The method of claim 18 wherein thickener is present in the aqueous composition at a concentration of from about 0.5 to about 5 weight percent.

24. The method of claim 18 wherein the aqueous composition additionally comprises a colorant.

25. The method of claim 18 wherein said surface is painted.

26. The method of claim 18 wherein said surface is bare metal.

27. A method of protecting a surface of a metal substrate during drawing or forming of said metal substrate comprising:
   i) applying an aqueous composition to said surface, said aqueous composition having a pH in the range of from about 8 to about 10 and a viscosity at 25° C. in the range from about 500 to about 3000 cps and comprising:
      a) water;
      b) from about 5 to about 20 weight percent of one or more polymeric resins consisting essentially of 50 percent to 100 percent by weight of one or more a polyvinyl alcohol resins and 0 percent to 50 percent by weight of one or more water-soluble or water dispersible resins selected from acrylic, polyethylenimine, polyethylene oxide, polyvinyl pyrrolidone and polyacrylamide resins, wherein the polyvinyl alcohols have a degree of hydrolysis of from about 85 to about 95% and a number average molecular weight of from about 10,000 to about 100,000.

c) from about 0.05 to about 0.6 weight percent of at least one surfactant selected from the group consisting of perfluoroalkyl polyether non-ionic surfactants, fluoroaliphatic polymeric ester non-ionic surfactants, fluoroaliphatic surfactants, fluoroaliphatic sulfonate surfactants, amine perfluoroalkyl sulfonate surfactants, alkoxylated phenol surfactants, and acetylenically unsaturated non-ionic surfactants;

d) from about 0.5 to about 7 weight percent of at least one corrosion inhibitor selected from the group consisting of alkanolamines, adducts of carboxylic acids and amines, and heterocyclic amines; and e) from about 0.2 to about 5 weight percent of at least one coalescing solvent selected from the group consisting of C1–C6 alkyl monoethers of glycols and glycol oligomers, glycol oligomers, polyalkylene glycols, glycols, polyols containing 3 or more hydroxl groups per molecule, and esters of polyols containing 3 or more hydroxyl groups per molecule;

ii) drying said aqueous composition to form an easily removable protective coating on said surface, which protective coating is removable by peeling off or by contacting with water or an aqueous alkaline solution;

iii) drawing or forming the metal substrate having the easily removable protective coating thereon; and iv) removing the easily removable protective coating from the formed or drawn metal substrate using water or an aqueous alkaline solution.

28. The method of claim 27 wherein the aqueous composition additionally comprises at least one additive selected from the group consisting of flow modifiers, thickeners, defoamers, and colorants.

29. The method of claim 27 wherein the aqueous composition comprises alkanolamine and at least one adduct or a carboxylic acid and an amine or at least one heterocyclic amine and at least one adduct of a carboxylic acid and an amine.

30. The method of claim 27 wherein said surface is painted.

31. The method of claim 27 wherein said surface is bare metal.

32. A method of protecting a surface of a metal substrate during drawing or forming of said metal substrate comprising:

i) drawing of forming a said metal substrate having temporary protective coating on said surface, said temporary protective coating comprising:
  a) at least one polyvinyl alcohol;
  b) at least one surfactant; and
  c) at least one corrosion inhibitor; and ii) removing the temporary protective coating from the metal substrate using water or an aqueous alkaline solution.

33. The method of claim 32 wherein said temporary protective coating comprises at least one polyvinyl alcohol, at least one surfactant, at least one alkanolamine, at least one corrosion inhibitor in addition to alkanolamine, and at least one thickener.

34. The method of claim 32 wherein the temporary protective coating is comprised of:

a) at least one polyvinyl alcohol having a degree of hydrolysis of from about 85 to about 95% and a number average molecular weight of from about 10,000 to about 100,000.

b) at least one surfactant; and c) at least one alkanolamine and at least one adduct of a carboxylic acid and an amine or at least one heterocyclic amine and at least one adduct of a carboxylic acid and a heterocyclic amine.

* * * * *

UNITED STATES PATENT AND TRADEMARK OFFICE
CERTIFICATE OF CORRECTION

PATENT NO. : 6,448,313 B1
DATED : September 10, 2002
INVENTOR(S) : Bhanu D. Patel It is certified that error appears in the above-identified patent and that said Letters Patent is hereby corrected as shown below:

<u>Column 9,</u>
Line 29, delete "comprises", and insert therefor -- comprised --.
Line 44, after "molecule", delete ".", and insert therefor -- , --.
Lines 47 and 50, delete "(I)", and insert therefor -- (b) --.

<u>Column 12,</u>
Line 2, delete "or", and insert therefor -- of --.
Lines 10-38, claims 32-34, should read:

32. A method of protecting a surface of a metal substrate during drawing or forming of said metal substrate comprising:
    i)    drawing or forming a said metal substrate having [temporary] an easily removable protective coating on said surface, said [temporary] easily removable protective coating comprising:
        a) [at least] one or more polymeric resins consisting essentially of 50 percent to 100
        percent by weight of one or more a polyvinyl alcohol resins and 0 percent to 50 percent by weight of one or more resins selected from water-soluble or water dispersible acrylic, polyethylenimine, polyethylene oxide, polyvinyl pyrrolidone and polyacrylamide resins, wherein the polyvinyl alcohols have a degree of hydrolysis of at least 80% and a number average molecular weight of from about 10,000 to about 100,000;
        b) at least one surfactant; and
        c) at least one corrosion inhibitor; and
    ii)    removing the [temporary] easily removable protective coating from the metal substrate using water or an aqueous alkaline solution.

33. The method of claim 32 wherein the polymeric resins (a) of said [temporary] easily removable protective coating consists essentially of polyvinyl alcohol resins and said easily removable protective coating further comprises [at least one polyvinyl alcohol,] at least one surfactant, at least one alkanolamine, at least one corrosion inhibitor in addition to alkanolamine, and at least one thickener.

UNITED STATES PATENT AND TRADEMARK OFFICE
CERTIFICATE OF CORRECTION

PATENT NO.    : 6,448,313 B1
DATED         : September 10, 2002
INVENTOR(S)   : Bhanu D. Patel It is certified that error appears in the above-identified patent and that said Letters Patent is hereby corrected as shown below:

34. The method of claim 32 wherein the temporary protective coating is comprised of
[:] at least one alkanolamine and at least one adduct of a carboxylic acid and an amine or at least one heterocyclic amine and at least one adduct of a carboxylic acid and a heterocyclic amine.
[a) at least one polyvinyl alcohol in the aqueous composition is a polyvinyl alcohol having a number average molecular weight of from about 10,000 to about 100,000;
b) at least one surfactant; and
c) at least one alkanolamine and at least one adduct of a carboxylic acid and an amine or at least one heterocyclic amine and at least one adduct of a carboxylic acid and heterocyclic amine.]

Signed and Sealed this

Twenty-third Day of September, 2003

JAMES E. ROGAN
*Director of the United States Patent and Trademark Office*